Figure 1:
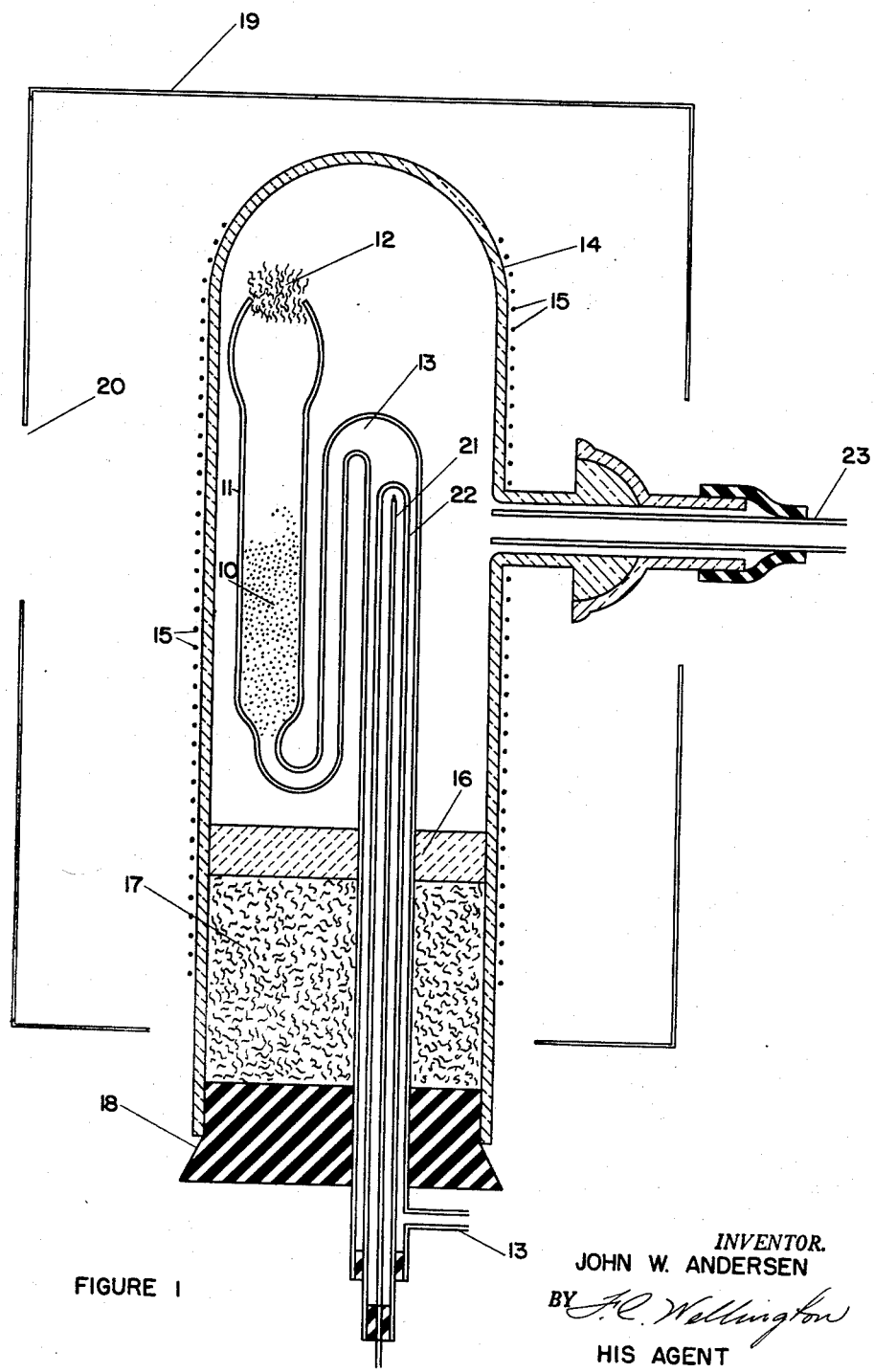

May 10, 1960      J. W. ANDERSEN      2,936,217
METHOD FOR CHLORINATING TITANIUM OXIDE MATERIAL
Filed Sept. 8, 1954      2 Sheets-Sheet 1

*INVENTOR.*
JOHN W. ANDERSEN
BY
HIS AGENT

United States Patent Office 2,936,217
Patented May 10, 1960

2,936,217

METHOD FOR CHLORINATING TITANIUM OXIDE MATERIAL

John W. Andersen, Dayton, Ohio, assignor to Monsanto Chemical Company, St. Louis, Mo., a corporation of Delaware Application September 8, 1954, Serial No. 454,778

Claims priority, application Canada June 3, 1954

7 Claims. (Cl. 23—87)

This invention relates to a process for producing titanium tetrachloride. More specifically it relates to a process for producing titanium tetrachloride by the chlorination of finely divided solid titanium oxide-bearing material in fluidized beds.

The formation of titanium tetrachloride by the reaction of gaseous chlorine with a mixture of solid titanium dioxide-bearing material and carbon has been known for a long time. However, the utilization of this reaction in a large-scale continuous production process poses many technical difficulties which, until the present time, have not been overcome.

Early attempts to carry out the above reaction in a commercial-scale process involved compressing the solid reactants into briquettes and continuously introducing the briquettes into a vertical shaft kiln or furnace into which chlorine gas was continuously introduced at the bottom and passed upwardly through the bed of briquettes. The solid residue, or ash, was withdrawn continuously from the bottom of the kiln and the titanium tetrachloride along with other reaction gases, was continuously withdrawn from the top of the furnace. (As illustrative of such a process, see Muskat and Taylor, U.S. 2,253,471.) These early processes suffer from numerous major drawbacks, one of which is the inherent difficulty in handling and maintaining a continuous flow of the solid reactants and reaction products, which cake, stick or otherwise clog up the reaction chamber. Another major difficulty arises as a result of the countercurrent passage of the solids and gases through the reaction chamber. As a result of such countercurrent flow the residual solids, or ash, leaving the reaction zone at the bottom of the furnace are cooled by the incoming reactant gases and the reaction product gases leaving the top of the reaction zone are cooled by the incoming solids introduced at the top of the furnace. Because of this cooling effect upon all of the materials leaving the reaction zone, only a small proportion of the rather large heat of reaction evolved during the chlorination of the titanium-bearing material is removed with the reaction products. Thus, the major portion of the heat of reaction has to be removed through the walls of the reactor or furnace. Failure to remove this heat as fast as it is released during the reaction will result in the temperature of the reaction zone continuously rising until the materials of construction of the furnace fail. The adequate removal of the heat of reaction through the furnace walls is not too difficult with small diameter furnaces, since the outer surface through which the heat must be transferred is relatively large with respect to the reaction volume in which the heat is released. However, when larger furnaces are used to increase the production of titanium tetrachloride, the ratio of outer surface (through which heat must be removed) to the inside reaction volume (in which heat is being released) becomes relatively small, so that the heat of reaction cannot be withdrawn sufficiently rapidly. Consequently, the production of titanium tetrachloride can be increased only by using a large number of rather small furnaces. Since this procedure results in very high costs both in capital investment and in maintenance and operation, the foregoing process has never been satisfactorily utilized for economical large scale commercial production of titanium tetrachloride.

With the relatively recent surge in interest in the application of fluidized bed techniques to chemical processes, there has been considerable interest in several proposed processes for the production of titanium tetrachloride by the chlorination of fluidized solids. These so-called fluidized processes are particularly attractive because of the ease with which the solid materials can be handled and transported. In spite of this advantage, however, none of the proposals have as yet been successful for large scale commercially economical production.

In order to meet the requirements for large scale commercially economical production, a process must provide, inter alia, a high degree of titanium value extraction from the raw material source, a high degree of chlorine utilization, and relatively high reactor productivity. When these requirements are superimposed upon those which are necessary to maintain a fluidized operation, and then applied to the particular system involving the reaction of a gas (e.g., chlorine) with a mixture of solids (e.g., $TiO_2+C$), the relationships between the numerous dependent and independent variables in the operation of such a process become very involved.

For example, the requirement that the solid be in a fluidized state in the gas stream imposes several limitations upon the physical characteristics of the solids (e.g., size, shape, density, etc.), which limitations are dependent upon particular properties of the gas (e.g., velocity, density, and viscosity). The requirement that the solids and gases chemically interact (with specified minimum standards of conversion and efficiency) imposes an entirely separate and distinct dependency between the properties of the solids and gases. Other limitations are imposed by the practical requirements (1) that the reaction temperature must be low enough that standard materials of construction can be utilized, but high enough that the reaction will be substantially thermally self-sustaining and (2) that the reaction rates be sufficiently high that equipment requirements will not be prohibitively large for a given production capacity.

Since all of the aforementioned limiting factors are relatively sensitive functions of the same independent variables (namely, physical and chemical states of reactants as introduced into the reaction, rates of introduction of said reactants, and thermal energy transferred to or from the reaction zone), it is readily apparent that it would be quite unexpected that a set of conditions could be found under which all of the above-discussed requirements could be simultaneously satisfied.

In spite of all of the difficulties discussed above, it has now been found that there are certain conditions, specified more fully below under which high titanium extraction efficiency, high chlorine utilization and high reactor productivity can be simultaneously achieved in a fluidized solids process for producing titanium tetrachloride by the chlorination of titanium oxide-containing materials. More specifically, it has now been found that a titanium extraction efficiency as high as 90 to 95 percent, chlorine conversion as high as 100 percent, and reactor productivity as high as 40 or more pounds of titanium tetrachloride per hour per cubic foot of reactor volume can be simultaneously achieved if said process is carried out by passing gaseous chlorine and reactive solid agglomerates of a titanium oxide and carbon in parallel-current flow through a reaction zone maintained at a temperature between about 700° C. and about 950° C., provided the agglomerates are substantially all between 8 and 200 mesh (U.S.

Standard Sieve size) and have a suitable chlorine reactivity, $\alpha_\theta$, defined and discussed more fully hereinbelow.

The terms, "titanium extraction efficiency," "chlorine conversion," and "reactor productivity," as used herein, have the following meanings:

Titanium extraction efficiency (expressed as a percentage) is one hundred times the mass ratio of (1) titanium removed from the feed solids to (2) titanium originally in said feed solids.

Chlorine conversion (expressed as a percentage) is one hundred times the mass ratio of (1) the difference between the molecular chlorine introduced into the reaction zone and the molecular chlorine in the gaseous reaction products to (2) molecular chlorine introduced into the reaction zone.

Reactor productivity is the mass of titanium tetrachloride produced per unit time per unit volume of fluidized reaction bed.

In carrying out the present process, the solids in the reaction zone must be fluidized by the gaseous reactants in a turbulent, dense-phase fluidized bed. The various terms such as "fluidized," "fluidized bed," "turbulent bed," "dense-phase," etc., as used herein, are defined in Industrial and Engineering Chemistry, volume 41, No. 6 (June 1949), pages 1249 and 1250.

The requirement as to parallel-current flow of the solids and gases is not, of course, one that each individual fluidized particle of solid should at all times flow in the same direction as the gas flow, but only that the net or general flow of solids be upward along with the gases. It is preferred that the feed solids be introduced into the reaction zone at the bottom or lowest portion of the reaction bed, and that the reacted solids be removed from the top or uppermost portion of the reaction bed. However, the solids can be fed to, or removed from, the reaction bed at intermediate points, so long as the solids are removed from the bed at a level higher than that at which they are introduced into the bed.

The gaseous reactant, chlorine, in the present process is preferably utilized in the substantially pure undiluted form, since the highest reactor productivity for a given titanium extraction and chlorine utilization can be obtained in this way. However, it is conceivable that under some conditions a source of dilute chlorine might be available at a sufficiently low cost that it would be economical to utilize the dilute gaseous reactant at the expense of reduced reactor productivity. In such cases concentrations of chlorine as low as 75 mole percent or even 50 mole percent of chlorine in diluent gas such as nitrogen, argon, carbon dioxide, etc. can be effectively utilized. It should be pointed out that it is undesirable to use a gas containing appreciable amounts of hydrogen therein, since this results in the formation of hydrogen chloride.

The rate of introduction of the gaseous reactant is rather severely limited by the fact that it is the fluidizing medium for maintaining the solid reactants in a fluidized state. For this reason the rate of introduction of the gas to the reaction zone must be such that the superficial linear velocity of the gas (i.e., the linear velocity of the gas calculated as though the gas were passing through the reaction zone at the existing temperature and pressure conditions, but in the absence of any solids) is between about 0.1 and about 1.5 feet per second, and preferably between about 0.2 and about 0.8 feet per second.

As was indicated above, the solid reactants utilized in the process of the present invention must be used as solid agglomerates of the titanium oxide-bearing material and the carbon, said agglomerates being sized so that substantially all will pass an 8-mesh screen but will be held on a 200-mesh screen (dry screen analysis). A desirable agglomerate size distribution is such that 70 percent, by weight of said agglomerates will be between 18 and 140 mesh. More preferred is a size distribution such that 80 percent by weight of said agglomerates will be between 20 and 100 mesh.

The individual particles making up the agglomerates should be bound together sufficiently tightly that there is a minimum of physical disintegration during the chlorination. If the agglomerates were to undergo any appreciable disintegration in the fluidized bed, the resulting fines would be prematurely swept from the reaction zone by the fluidizing gases, thus giving a poor extraction efficiency of titanium from such solids. Satisfactorily strong agglomerates can be readily prepared by utilizing suitable binders, described in more detail below, and by comminuting the solid reactants (to be agglomerated) to the required degree of fineness (also specified below).

It is further required that the agglomerates useful according to the present invention have a chlorine reactivity, $\alpha_\theta$, within certain specified ranges. Chlorine reactivity, $\alpha_\theta$, is defined as the percent extraction of titanium obtained by passing 50 grams of a mixture of 5 mole percent chlorine in carbon dioxide through 1 gram of solid particles at 800° C. at a uniform rate over a period of time, $\theta$. Thus, an agglomerate having an $\alpha_{60}$ equal to 75 percent is one which required 60 minutes to extract 75 weight percent of the titanium from the agglomerate when held at 800° C. in a gas stream of 5 percent chlorine in carbon dioxide. In order to be useful according to the present invention, the agglomerates must have a chlorine reactivity, $\alpha_{60}$, between about 45 percent and about 95 percent, and preferably between about 50 percent and about 85 percent.

The chlorine reactivity of an agglomerate can be determined in numerous ways, one of which is by means of a so-called differential reactor illustrated in Figure 1. With reference to Figure 1, the chlorine reactivity of the agglomerates is determined by placing a mass of the agglomerates 10 in a fluidizing chamber 11, made from a transparent temperature-resisting material such as "Vycor," and fluidizing said agglomerates by passing a gas mixture containing 95 mole percent carbon dioxide and 5 mole percent chlorine into and through the tube 13 and upwardly through solid agglomerates 10 in the fluidizing chamber 11. A refractory wool plug 12 is placed in the top of the chamber 11 to prevent the solids from being blown out by any sudden surges of gas. The fluidizing chamber assembly is placed in a transparent high temperature resistant enclosure 14 made from a material such as "Vycor" and wound with an electrical heating coil 15 so that the temperature in the enclosure 14 can be maintained at any predetermined level. The lower portion of the enclosure 14 is sealed with a gas-tight closure consisting of a graphite plug 16, refractory wool insulation 17 and a rubber stopper 18. This entire assembly is positioned within a cylindrical chromium-plated reflector 19 to facilitate the maintenance of uniform and elevated temperatures within the enclosure 14. The reflector 19 is provided with an opening 20 through which the solids in the fluidizing chamber 11 can be observed by the operator of the differential reactor. A thermocouple 21 in a graphite-coated "Vycor" sheath 22 is provided for temperature indication. In operating the differential reactor, the temperature is maintained at 800° C.±2° C. Gas of the composition noted above is passed into and through the tube 13 (where it is preheated to 800° C.) and into the fluidizing chamber 11. The gases then pass out of the fluidizing chamber 11 and out of the enclosure 14 through the opening 23 from which they are led to a condenser in which the titanium terachloride and other condensable products are recovered from the gas stream.

The degree of titanium extraction from the solids in the bed 10 can be readily determined as a function of time by calculations based upon (1) analyses of the solid agglomerates before treatment in the differential reactor and (2) analyses of the solids after treatment in the differential reactor or determinations of the quantity of titanium tetrachloride collected from the gas stream passing out through the opening 23.

Some care must be exercised in the interpretation of results obtained with the above-described differential reactor, in order to insure that the reactivity evaluated is, in fact, the reactivity of the solid agglomerates rather than the reactivity of a physical degradation product. For example, as was indicated previously, some agglomerates are unsatisfactory for use in the present invention because they disintegrate into fines which are blown from the reactor. If such an agglomerate is tested in the differential reactor, the value of reactivity obtained will not be the reactivity of the agglomerate, but rather (at least to a large extent) the reactivity of the fines. Thus, it is necessary to observe the character of the solid residue after chlorination in the differential reactor, in order to determine whether the reactivity found is that of a solid agglomerate or that of a physical variation of the agglomerate. If the solid residue is a dry, granular, free-flowing material like the agglomerated feed, then the reactivity determined is that of the agglomerate. If the solid residue is a fine, dusty, powdered ash (or if the residue contains appreciable proportions of such an ash), or if the residue sticks, cakes, or clumps together, this is an indication that the solid agglomerates have undergone some physical change (such as disintegration, fusion, etc.) during the reaction, so that the reactivity determined is not that of the solid agglomerate.

If the chlorine reactivity of an agglomerate cannot be determined in the differential reactor because of physical degradation, such an agglomerate would be unsatisfactory for chlorination according to the present invention because continuous chlorination of the solid agglomerate (rather than a degradation product thereof) is required. Thus, the above-described differential reactor serves the dual purpose of designating which agglomerates have a suitable chlorine reactivity, and of eliminating those having unsatisfactory strengths or mechanical suitability.

As might be expected, there are numerous factors which can effect appreciable changes in the chlorine reactivity of agglomerates of titanium oxide and carbon. The principal factors are as follows:

(a) *Agglomerate size.*—Although the chlorine reactivity will not vary markedly with agglomerate size within the range of agglomerates useful in the present invention, there will be some variations. In general, chlorine reactivity will increase with decreasing agglomerate size.

(b) *Ultimate particle size.*—The size of the individual particles of titanium oxide material and carbon which are utilized in making up the agglomerates for use according to the present invention has a very decided effect upon the chlorine reactivity of the agglomerate. As a general rule, the chlorine reactivity of the agglomerate will increase as the individual particles making up the agglomerate are decreased in size. In order to obtain appropriate chlorine reactivities of the agglomerates, the ultimate particle sizes of the solid titanium-bearing material in the agglomerate should be 80 percent—200 mesh, and preferably 80 percent—325 mesh. The carbonaceous reducing agent can be somewhat coarser, e.g., 80 percent—140 mesh, but is preferably 80 percent—200 mesh.

(c) *Bonding Agent.*—In making up the agglomerates of the individual finely divided solid reactants, it is necessary that some sort of binder be utilized. It has been found that the particular binder chosen, and the concentration thereof, are both very important factors affecting the chlorine reactivity of the agglomerates. As a general proposition it has been found that organic bonding agents are unsatisfactory for producing good agglomerates for chlorination as described herein, and that the satisfactory binders usually fall within the class of glassy, inorganic, high-melting-point materials. Examples of suitable bonding agents useful for forming agglomerates having the proper chlorine reactivities are the various alkali metal silicates, and especially the di- and tetra-silicates or mixtures thereof, the various inorganic phosphates, such as the sodium, potassium, and other ortho-, meta-, pryo-, and polyphosphates, the hydroxides, such as sodium and potassium hydroxide, and various others. The concentration of the bonding agent utilized (based upon the total weight of solids in the agglomerate) will generally fall between about 5 or 6 precent and about 12 or 15 percent by weight. The use of substantially more binder than this recommended concentration will result in a very marked decrease in chlorine reactivity of the agglomerate formed. The use of substantially less will give an agglomerated particle having insufficent mechanical strength, so that the particle will break apart during chlorination.

(d) *Nature of titaniferous material.*—The nature of the titanium oxide-containing solid material utilized in making up the agglomerates is another factor having a very marked effect upon the chlorine reactivity of the agglomerate formed. A preferred material, or source of titanium, is a so-called titanium oxide slag which is the by-product of a treatment of iron-titanium ore, e.g., ilmenite, to recover iron therefrom. In the course of such treatments the predominant proportion of the iron originally in the ore is removed, but appreciable quantities of calcium, magnesium and aluminum oxides are added thereto in order to increase the fluidity of the slag and facilitate treatment thereof. Consequently, the by-product slag is generally rather high in titanium oxide and low in iron oxide, but also contains appreciable quantities of calcium, magnesium, aluminum, and silicon oxides. Another suitable source of titanium oxide material comprises the rare earth and heavy metal niobate-titanate minerals, such as euxenite, polycrase, aeschynite, blomstrandine, risorite, wiikite, hainite, astrophyllite, delorenzite, keilhauite, knopite, lorenzenite, yttrocrasite, and similar materials, as well as beneficiated products thereof. Other suitable sources of titanium oxide material are iron-titanium ores as such (e.g., ilmenite), or residues of such ores obtained by chemical pretreatment (such as chlorination) to remove the excessively high quantities of iron therein. Rutile is also a suitable source of titanium oxide.

(e) *Carbon source.*—The source of carbon which is utilized in making up the present agglomerates is a relatively unimportant factor except to the extent that impurities are introduced with the carbon. For this reason, petroleum coke (which has only a negligible ash content) is particularly suitable. However, ordinary coke, hard coal, charcoal and other forms of carbon can be utilized equally well. As indicated earlier, the presence of hydrogen is undesirable because of the formation of hydrogen chloride and the deleterious attack upon materials of construction. Consequently, sources of carbon containing appreciable quantities of hydrocarbons or other hydrogen-containing materials are not especially suited for use in making the present agglomerates.

(f) *Ratio of carbon to metallic oxides.*—The concentration of carbon as a function of the concentration of metallic oxide in the agglomerate is of importance to the extent that a definite minimum concentration of carbon must be present. This minimum is the stoichiometric amount required to convert all of the oxygen (usually present as metallic oxides) in the titanium oxide-bearing material to the mixture of carbon monoxide and carbon dioxide which will be produced by the chlorination reaction in which the agglomerates are to be utilized. Unless this minimum concentration of carbon is present, the chlorine reactivity of the agglomerate will fall off very rapidly. Since it is relatively difficult to predict in advance precisely what carbon monoxide-carbon dioxide ratio will exist in any particular chlorination reaction, it is recommended that the amount of carbon utilized in the agglomerates be sufficient to convert (on a stoichiometric basis) all of the oxygen in the titaniferous solid to carbon monoxide.

(g) *Agglomeration procedure.*—The particular procedure followed in the formation of the agglomerates for use according to the present invention does not appear to be a particularly critical factor affecting chlorine reactivity of the agglomerates. Various agglomeration procedures may be utilized, a preferred one being that as described in my copending patent application, Serial No. 383,013, filed September 29, 1953, now abandoned, and the continuation-in-part thereof, Serial No. 454,777, filed on even date herewith. Suitable agglomerates can also be prepared by briquetting the mixture of solids with a binder and then grinding up the briquettes to a suitable agglomerate size. Likewise, agglomerates can be prepared by forming thin dried films of the solids with the binder and then breaking up the thin films into small particles, such as by passing them between rubber-covered rollers.

The following table is presented to illustrate more fully the effect of variations of the above-discussed factors upon the chlorine reactivity of various solid agglomerates of titanium oxide material and carbon. The table also indicates several types of agglomerates which disintegrated to an appreciable extent during the determination of the chlorine reactivity in the differential reactor, and were consequently unsatisfactory feed materials for the present process.

As was stated above, the chlorine reactivity of the agglomerates which are suitable for the chlorination according to the present invention must have an $\alpha_{60}$ value between 45 percent and 95 percent. If the chlorine reactivity of the agglomerate is quite low (i.e., if the $\alpha_{60}$ is less than about 45 percent) the titanium extraction, chlorine utilization and/or reactor productivity will be very poor and will decrease very rapidly with decreasing values of $\alpha_{60}$. If, on the other hand, the agglomerates are highly chlorine reactive (i.e., if the values of $\alpha_{60}$ are above about 95 percent) the control of the temperature of the chlorination reaction becomes very difficult. More specifically, the temperature of the entire bed, or at least of localized portions of the bed, will tend to rise above the 950° C. maximum below which the present reaction must be maintained. The result of such overheating of the fluidized bed will be slagging and clumping of the individual agglomerates, with a marked adverse effect upon the fluidized character of the bed and a resultant decrease in general and overall efficiency of the entire chlorination process.

The temperature of the reaction zone of the fluidized process must be maintained between about 700° C. and about 950° C., and preferably between about 750° C. and about 900° C. As a general rule the lower portions of this temperature range should be utilized with highly reactive agglomerates and the higher portions of this temperature range should be utilized with less reactive

TABLE

| Sample No. | Binder | | Ti-Bearing Material | | | Carbonaceous Reducing Agent | | | Agglomerates | | Solid Residue, Physical Character |
|---|---|---|---|---|---|---|---|---|---|---|---|
| | Type | Conc., Wt. Percent | Source | Particle Size, Screen Mesh | Conc., Wt. Percent | Source | Particle Size, Screen Mesh | Conc., Wt. Percent | Particle Size, Screen Mesh | $\alpha_{60}$, Wt. Percent | |
| 1 | Na Silicate $\left(\frac{SiO_2}{Na_2O}=3.2\right)$ | 4 | Q.I.T. Slag. | 80%—325 | 68.7 | Coke Breeze | 80%—325 | 27.3 | 90%—35, +100 | | Excessive fines; marked bulking tendency. |
| 2 | Na Silicate $\left(\frac{SiO_2}{Na_2O}=3.2\right)$ | 8 | ...do | 80%—325 | 65.8 | ...do | 80%—325 | 26.2 | 90%—35, +100 | 73; 73 | Excellent. |
| 3 | Na Silicate $\left(\frac{SiO_2}{Na_2O}=3.2\right)$ | 15 | ...do | 80%—325 | 60.8 | ...do | 80%—325 | 24.2 | 90%—35, +100 | 42; 42; 36 | Slightly sticky; otherwise excellent. |
| 4 | Na Silicate $\left(\frac{SiO_2}{Na_2O}=3.2\right)$ | 8 | ...do | 80%—200 | 65.8 | ...do | 80%—200 | 26.2 | 95%—60, +100 | 54; 49 | Excellent. |
| 5 | Na Silicate $\left(\frac{SiO_2}{Na_2O}=3.2\right)$ | 8 | ...do | 80%—200 | 65.8 | ...do | 80%—60 | 26.2 | 95%—35, +60 | 29; 37 | Do. |
| 6 | Na Silicate $\left(\frac{SiO_2}{Na_2O}=3.2\right)$ | 8 | Ilmenite | 80%—325 | 63 | ...do | 80%—325 | 29 | 90%—35, +100 | 73; 78 | Do. |
| 7 | Na Silicate $\left(\frac{SiO_2}{Na_2O}=3.2\right)$ | 6 | Q.I.T. Slag. | 80%—200 | 67.2 | ...do | 80%—200 | 26.8 | 90%—35, +100 | 37; 36 | Do. |
| 8 | Na Silicate $\left(\frac{SiO_2}{Na_2O}=1\right)$ | 8 | ...do | 80%—325 | 65.8 | Petroleum Coke. | 80%—325 | 26.2 | 90%—35, +100 | 79; 81 | Slight bulking tendency; otherwise satisfactory. |
| 9 | NaOH | 8 | Rutile | 80%—325 | 59 | Coke Breeze | 80%—325 | 33 | 90%—35, +100 | 72; 79 | Excellent. |
| 10 | Na$_2$CO$_3$ | 8 | Q.I.T. Slag. | 80%—325 | 65.8 | ...do | 80%—325 | 26.2 | 90%—35, +100 | | Substantially complete disintegration of agglomerate. |
| 11 | Al Phosphate | 8 | ...do | 80%—325 | 65.8 | ...do | 80%—325 | 26.2 | 90%—35, +100 | | Do. |
| 12 | Dextrin | 8 | ...do | 80%—325 | 65.8 | ...do | 80%—325 | 26.2 | 90%—35, +100 | | Do. |
| 13 | Starch | 8 | ...do | 80%—325 | 65.8 | ...do | 80%—325 | 26.2 | 90%—35, +100 | | Do. |
| 14 | Coal Tar | 8 | ...do | 80%—325 | 65.8 | ...do | 80%—325 | 26.2 | 90%—35, +100 | | Do. |
| 15 | Molasses | 8 | ...do | 80%—325 | 65.8 | ...do | 80%—325 | 26.2 | 90%—35, +100 | | Do. |
| 16 | Na Silicate $\left(\frac{SiO_2}{Na_2O}=3.2\right)$ | 8 | ...do | 80%—325 | 65.8 | ...do | 80%—325 | 26.2 | 90%—20, +100 | 57 | Excellent. |
| 17 | Na Silicate $\left(\frac{SiO_2}{Na_2O}=3.2\right)$ | 8 | Euxenite[1] | 90%—325 | 64 | ...do | 100%—170 (80%—200) | 26.2 | 90%—35, +100 | ~90 | Do. |

[1] Approximate analysis: 19 wt. percent TiO$_2$; 21 wt. percent rare earth oxides; 16 wt. percent Nb$_2$O$_5$; 12 wt. percent Fe$_2$O$_3$; remainder miscellaneous oxides.

agglomerates. If the temperature of the reaction bed is allowed to fall below the temperatures specified herein, the chlorination reaction will either fail to take place at all or, at best, will be very inefficient—with low titanium extraction, chlorine utilization and/or reactor productivity.

Figure 2:
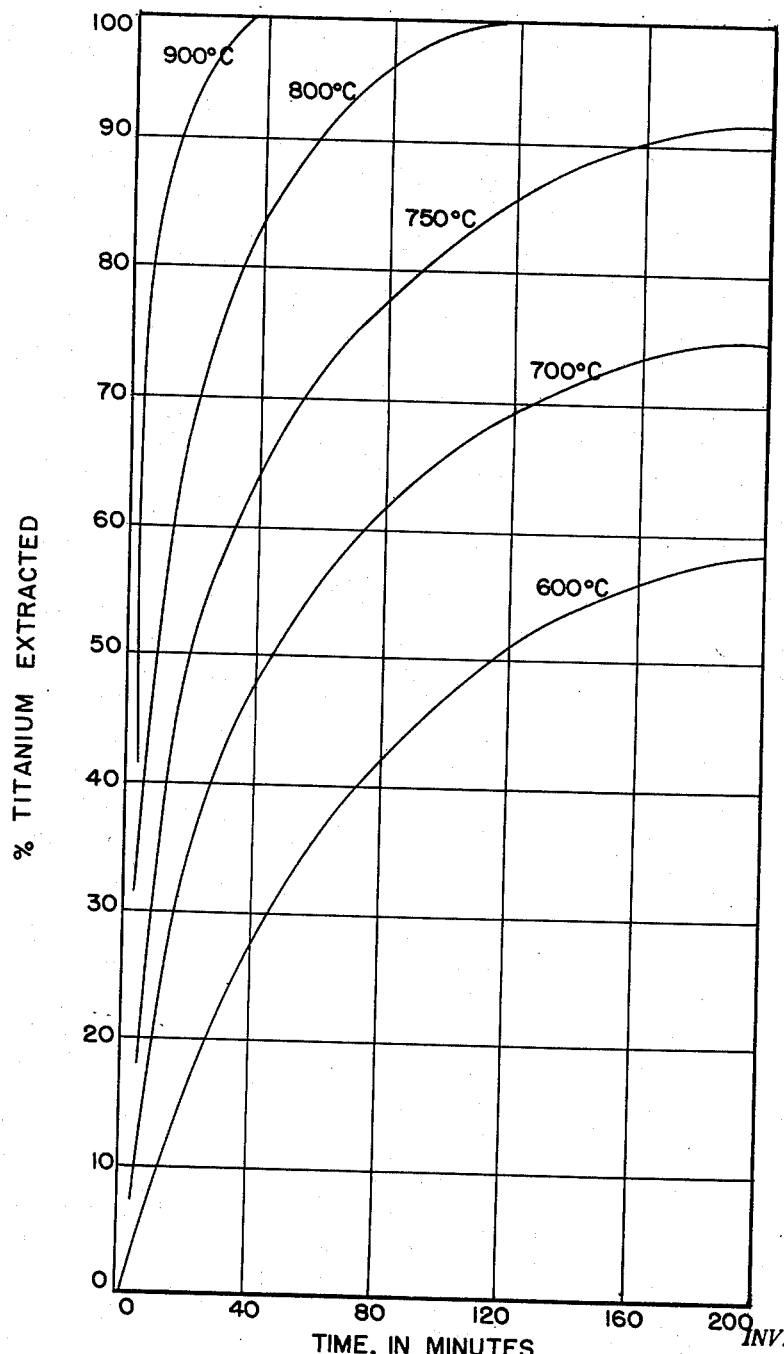

If the temperature of the reaction zone is maintained at too high a level, the result will be somewhat analogous to the use of agglomerates with extremely high chlorine reactivity. Thus, the use of unduly high temperatures, even with agglomerates of the proper chlorine reactivities will result in temperature control difficulties and the development of localized hot spots with slagging, clumping, etc. of the fluidized bed and general overall reduction of titanium extraction, chlorine conversion, and reactor productivity. The relatively marked effect of reactor bed temperatures is illustrated in Figure 2 of the drawings, which is a set of curves showing the titanium extraction rates of a typically reactive agglomerate as a function of temperature. As can be readily recognized from this set of curves, the reaction rate at the low temperatures falls off very rapidly with the result that the titanium extraction is severely limited. On the other hand, if the reaction temperature is too high, the rate of reaction is so great that the heat of reaction from any particular agglomerate is evolved more rapidly than it can be dissipated throughout the bed. Thus, localized hot spots develop with the resultant adverse effects discussed above.

The following examples are indicative of the highly successful nature of the process of the present invention.

*Example 1*

Solid feed agglomerates were made up to have the following composition:

26.2 weight percent of coke breeze (80 percent minus 325 mesh),
65.8 weight percent of a titaniferous slag material commercially marketed as Q.I.T. slag (80 percent minus 325 mesh), and
8.0 weight percent of sodium silicate ($SiO_2/Na_2O = 3.22$)

The agglomerate particle size distribution was as follows:

6.1 wt. percent—18 mesh, +35 mesh;
88.0 wt. percent—35 mesh, +60 mesh;
1.5 wt. percent—60 mesh, +100 mesh;
2.2 wt. percent—100 mesh, +140 mesh; and
2.2 wt. percent—140 mesh.

The above-described agglomerates were chlorinated in a fluidized bed measuring 3.75 inches in diameter and 7 feet in height. Steady-state continuous operation was maintained for about 4 hours at about 800° C. while feeding into the fluidized bed 19.9 pounds per hour of chlorine and 20 pounds per hour of solid feed, and withdrawing 6.6 pounds per hour of ash, 24.2 pounds per hour of total condensable gases and 67.0 cubic feet per hour (S.T.P.) of non-condensable gases. The condensable gases contained 21.2 pounds per hour of titanium tetrachloride, thus resulting in a titanium extraction of 91.5 percent and a reactor productivity of 39.5 pounds of titanium tetrachloride per hour per cubic foot of reactor bed. The chlorine conversion was 100 percent.

*Example 2*

The solid feed utilized in this run was the same as the feed utilized in Example 1, except that agglomerate particle size distribution was as follows:

1.8 wt. percent—18 mesh, +35 mesh;
82.0 wt. percent—35 mesh, +60 mesh;
13.0 wt. percent—60 mesh, +100 mesh;
1.2 wt. percent—100 mesh, +140 mesh; and
2.0 wt. percent —140 mesh.

The solid feed was chlorinated in a fluidized bed of the same size as in Example 1. Steady-state continuous operation was maintained for about 5 hours at about 780° C. while feeding 12.0 pounds per hour of solids and 13.1 pounds per hour of chlorine, and withdrawing 6.4 pounds per hour of ash, 14.2 pounds per hour of total condensable gases and 42.5 cubic feet per hour of non-condensable gases. 12.5 pounds per hour titanium tetrachloride was produced, thus giving a titanium extraction of 94.1 percent and a reactor productivity of about 23.2 pounds of titanium tetrachloride per hour per cubic foot of reactor bed. The chlorine conversion was 100 percent.

*Example 3*

The solid feed utilized in this run was of the same lot as that used in Example 1.

The solids were chlorinated in a fluidized bed as in the foregoing examples, except that the temperature of chlorination was maintained at 750° C. Steady-state continuous operation was maintained for about 4 hours while feeding 18.2 pounds per hour of chlorine and 18.0 pounds per hour of solids, and withdrawing 9.0 pounds per hour of ash, 19.4 pounds per hour of total condensable gases and 54.2 cubic feet per hour of non-condensable gases. 17.2 pounds per hour of titanium tetrachloride was recovered from the condensable gases, thus giving a titanium extraction of 89.5 percent and a reactor productivity of 32 pounds of titanium tetrachloride per hour per cubic foot of reactor bed. The chlorine conversion was 100 percent.

*Example 4*

Solid feed agglomerates made up as in sample 16 in the above table, and having a particle size distribution as follows:

0.4 wt. percent—10 mesh, +18 mesh;
4.4 wt. percent—18 mesh, +20 mesh;
20.5 wt. percent—20 mesh, +35 mesh;
40.2 wt. percent—35 mesh, +60 mesh;
29.9 wt. percent—60 mesh, +100 mesh;
4.1 wt. percent—100 mesh, +140 mesh;
0.5 wt. percent—140 mesh, +170 mesh;

were chlorinated in a fluidized bed measuring 8 inches in diameter and 7 feet in height. Steady-state continuous operation was maintained for about 17 hours at about 880° C., while feeding into the fluidized bed 102.5 pounds per hour of chlorine and 91.8 pounds per hour of solid feed, and withdrawing 34.2 pounds per hour of ash and 122 pounds per hour of condensable gases (including fine ash carried out of the bed by the gas stream). The condensable gases contained about 102.3 pounds per hour of titanium tetrachloride. The foregoing operation resulted in a titanium extraction of 94.2 percent and a reactor productivity of about 42 pounds of titanium tetrachloride per hour per cubic foot of reactor bed. The chlorine conversion was nearly complete, there being only about 1 or 2 percent by volume of chlorine in the non-condensable off-gases.

The present application is a continuation-in-part of my copending application Serial No. 383,014, filed September 29, 1953, now abandoned.

I claim:

1. A method for continuous, steady-state production of titanium tetrachloride by the chlorination of solid bonded agglomerates of: finely divided titanium oxide-bearing material of which at least 80% will pass a 200-mesh screen, and finely divided solid carbonaceous reducing agent of which at least 80% will pass a 140-mesh screen, the amount of carbonaceous reducing agent in said agglomerates being stoichiometrically sufficient to convert all of the oxygen in said titanium oxide-bearing material to the carbon monoxide/carbon dioxide mixture produced under the existing chlorination conditions, said finely divided titanium oxide-bearing material and said finely divided carbonaceous reducing agent being bonded together with an inorganic chemical binder of sufficient strength to prevent substantial physical degradation of the agglomerates during chlorination thereof, said agglomerates having particle sizes between 8 and 200 mesh and, in addition to all of the foregoing requirements, having a chlorine reactivity, $\alpha_{60}$, between about 45% and about 95%; which method comprises continuously contacting gaseous chlorine and the aforesaid agglomerates in a fluidized bed reaction zone maintained at a temperature between about 700° C. and about 950° C., the upward velocity of the gas being sufficient to maintain said solids in a turbulent fluidized state.

2. The method of claim 1 in which the reaction zone temperature is maintained between about 750° C. and about 900° C., and in which the solid agglomerates have a chlorine reactivity, $\alpha_{60}$, between about 50% and about 85%.

3. The method of claim 1 in which the reaction zone temperature is maintained between about 750° C. and about 900° C., the particle size distribution of the solid agglomerates is such that at least 70 weight percent thereof are between 18 and 140-mesh, and said agglomerates have a chlorine reactivity, $\alpha_{60}$, between about 50% and about 85%.

4. The method of claim 1 in which the reaction zone temperature is maintained between about 750° C. and about 900° C., the particle size distribution of the solid agglomerates is such that at least 80 weight percent thereof are between 20 and 100-mesh, and said agglomerates have a chlorine reactivity, $\alpha_{60}$, between about 50% and 85%.

5. The method of claim 1 in which the titanium oxide-bearing material utilized in the solid agglomerates is a titaniferous slag resulting from the metallurgical reduction of iron from an iron-titanium ore in the presence of calcium, magnesium and aluminum oxides to increase the fluidity of said slag during said iron reduction.

6. The method of claim 1 in which the inorganic chemical binder is a member selected from the group consisting of sodium silicates and sodium hydroxide.

7. A method for continuous steady-stage production of titanium tetrachloride by the chlorination of solid bonded agglomerates of: finely divided titaniferous slag resulting from the metallurgical reduction of iron from an iron-titanium ore in the presence of calcium, magnesium and aluminum oxides to increase the fluidity of said slag during said reduction of iron, said titaniferous slag having been ground to a degree of fineness such that at least 80% thereof will pass a 325-mesh screen, and finely divided carbonaceous solid reducing agent of which at least 80% will pass a 200-mesh screen, the amount of carbonaceous reducing agent in said agglomerates being at least the stoichiometric amount required to convert all of the oxygen in the titaniferous slag to carbon monoxide, said finely divided titaniferous slag and said finely divided carbonaceous reducing agent being bonded together with between about 5 and about 15 weight percent of an inorganic chemical binder selected from the group consisting of sodium silicates and sodium hydroxide, said agglomerates having particle sizes between 8 and 200 mesh and, in addition to all of the foregoing requirements, having a chlorine reactivity $\alpha_{60}$, between about 45% and about 95%; which method comprises continuously contacting substantially pure gaseous chlorine and said solid agglomerates in parallel-current upward flow through a reaction zone maintained at a temperature between about 750° C. and about 900° C., the upward velocity of said gas being sufficient to maintain said solid agglomerates in a turbulent fluidized state and sufficient to maintain a net upward flow of fluidized solids through said reaction zone.

References Cited in the file of this patent

UNITED STATES PATENTS

| | | |
|---|---|---|
| 2,184,884 | Muskat et al. | Dec. 26, 1939 |
| 2,378,675 | Agnew et al. | June 19, 1945 |
| 2,486,912 | Blechetz | Nov. 1, 1949 |
| 2,555,374 | Rowe et al. | June 5, 1951 |
| 2,622,005 | Aagaard et al. | Dec. 16, 1952 |
| 2,657,976 | Rowe et al. | Nov. 3, 1953 |
| 2,701,179 | McKinney | Feb. 1, 1955 |
| 2,701,180 | Krchma | Feb. 1, 1955 |

OTHER REFERENCES

Metals Transactions, vol. 185, November 1949, pages 785–791.